3,103,495
NOVEL INORGANIC THICKENING AGENTS AND PROCESS FOR PRODUCING SAME

Ernst Wagner and Helmut Brünner, Rheinfelden, Baden, Germany, assignors to Deutsche Gold- und Silber-Scheideanstalt vormals Roessler, Frankfurt am Main, Germany, a corporation of Germany
No Drawing. Filed Aug. 31, 1959, Ser. No. 836,908
Claims priority, application Germany Sept. 4, 1958
11 Claims. (Cl. 252—317)

This invention relates to a process for preparing thickening and reinforcing agents for liquids and pastes of all kinds, consisting of a special mixture of at least two different finely divided metal and/or metalloid oxides. Each of the individual oxides making up said mixture are first obtained separately in the form of a gas-borne aerosol by oxidizing or hydrolyzing a volatile compound of the corresponding metal or metalloid oxide at relatively high temperatures in the gaseous phase. In accordance with the invention, two or more of such separate aerosol streams, each containing finely divided primary solid particles of a different metal or metalloid, are mixed together and the oxides therein allowed to coagulate together to form secondary particles of a size that can be recovered by usual gas-solids separation techniques.

Thickening or strengthening the consistency of liquids or pastes is required in many branches of technology. A great number of finely divided substances are used for this purpose, the main problem being essentially to select substances that are compatible with the particular medium to be thickened and that are, in addition, active in the smallest possible quantities, so as not to modify unduly the character of the basic substance. Recently, highly dispersed pyrogenic oxides were successfully introduced as thickening agents. Since these oxides are produced by oxidation or hydrolysis of volatile metal or metalloid compounds in their gaseous state, they are not only extremely finely divided and surface active, but also exhibit a relatively uniform particle size distribution, so that they can be put to use with easily reproducible results. However, in order to achieve a high degree of viscosity in liquids, large quantities of these very finely divided oxides, which are valuable and expensive substances, have had to be added in many cases.

It has now been discovered that much more highly active thickening agents can be prepared from mixtures of such oxides if, through separate decomposition of a volatile compound of each of two or more metals (and/or metalloids) in the presence of oxidizing or hydrolyzing agents in the gaseous phase, the corresponding individual oxides are each obtained in the form of a fine solids-in-gas aerosol and these separate aerosol streams are then mixed together before the primary particles of each oxide have coagulated appreciably into larger secondary particles. Joint coagulation of the different oxides then occurs resulting in a particularly intimate physical mixture of the individual components due to the fact that the secondary flakes are built up in random fashion from the various primary oxide particles in the manner of a mosaic. For example, if silicon dioxide is produced by treating silicon tetrachloride vapor in a flame supported by air or oxygen and hydrogen, the silicon dioxide at first remains suspended in the gaseous reaction product as a sol of very finely divided particles. An aluminum oxide prepared in a corresponding manner from aluminum chloride and also suspended in the gaseous reaction products in the form of finely divided primary particles is then mixed with the above-mentioned aerosol; the resultant intimately mixed, combined aerosol is then coagulated causing the primary oxides particles to combine with one another to form much larger secondary agglomerates. In this form they can be separated by the usual procedures, e.g., in cyclones, electrofilters, etc.

The technique of producing the individual oxides is not the subject of this invention, nor is the basic technique of coagulation necessarily novel since coagulation can be suitably accomplished in several known ways including, for example, by means of long pipe lines with hairpin-like curves through which the aerosol products are carried in a highly turbulent current. The novel feature of this invention is the mixing together of separately formed aerosols of different pyrogenic oxides and then coagulating them jointly in the resultant combined aerosol stream.

The thickening agents of the invention may consist of jointly coagulated oxides built up from any two or more different pyrogenic metal or metalloid oxides. It is only necessary that each metal or metalloid in question form a reasonably volatile compound which lends itself to pyrogenic reaction in the gaseous phase, in the presence of oxygen and oxidizing and/or hydrolyzing gaseous substances, with resultant transformation to a fine solid oxide. Mixtures of silica with a few percent aluminum oxide have proven particularly satisfactory, and accordingly are particularly preferred but mixtures of silicon dioxide and titanium dioxide, or of titanium dioxide and aluminum oxide have proven quite suitable. Other suitable components include zirconium dioxide, iron oxides, vanadium dioxide, and many others. Simply, by regulating the gas currents, various percentage mixtures can be obtained. It is also easy and simple to produce ternary instead of binary mixtures, or mixtures with an even greater number of components.

So-called mixed oxides have in the past been produced by simultaneously pyrogenically decomposing a mixture of volatile compounds of two or more different metals or metalloids. However, even in the primary particles or molecular dimensions, such products contain the mixture components in the form of oxides, thus in an ideally intimate distribution. Such coformed mixed oxides, however, have virtually no thickening effect whatsoever in liquids or pastes, being much less effective in this respect than even crude physical mixtures of the corresponding oxide components. See for example, copending U.S. application S.N. 522,879, now U.S. Patent No. 2,951,044, of Wagner et al. It was thus surprising to discover that the oxide mixtures of the present invention produced by separate pyrogenic oxidation reaction but jointly coagulated represent highly effective thickening agents. From the knowledge gained about the coformed mixed oxides, it would have been anticipated that the special oxides mixture of the present invention would have at least somewhat lower thickening action than the ordinary crude physical mixtures of corresponding compositions.

The improvement to be achieved as regards the thickening action of the oxide mixtures through the use of the present invention will be illustrated below by means of comparative tests. In carrying out these examples, the thickening agent in each case was mixed with water in the respective quantities of 2, 3, 5, 10 and 15 g. per 100 ml. water with vigorous stirring, whereupon the viscosity of the dispersion was determined. The thickening agents used were:

Example 1

Chemically pure silicic acid obtained by the pyrogenic process with a primary particle size of between 4 and 25 m$\mu$.

Example 2

A coformed mixed oxide consisting of 99% $SiO_2$ and 1% $Al_2O_3$, likewise pyrogenically produced.

Example 3

An ordinary physical mixture of 96.1% pyrogenically prepared silicic acid with 3.9% pyrogenically produced aluminum oxide.

Example 4

A jointly coagulated mixture of 97.6% $SiO_2$ and 2.4% $Al_2O_3$.

Example 5

A jointly coagulated mixture of 96.4% $SiO_2$ and 3.6% $Al_2O_3$.

The results of the viscosity determinations on the above examples have been summarized in the following table.

| Example | Thickening Agent | Viscosity in degrees Engler with a thickening agent content per 100 ml. water (in grams) of— | | | | |
|---|---|---|---|---|---|---|
| | | 2 | 3 | 5 | 10 | 15 |
| 1 | $SiO_2$ | 1.005 | 1.01 | 1.03 | 1.08 | 1.17 |
| 2 | Coformed mixed oxide: 99% $SiO_2$, 1% $Al_2O_3$. | 1.000 | 1.01 | 1.02 | 1.06 | 1.11 |
| 3 | Ordinary physical oxide mixture: 96.1% $SiO_2$, 3.9% $Al_2O_3$. | 1.01 | 1.01 | 1.04 | 1.18 | 1.67 |
| 4 | Jointly coagulated oxide mixture: 97.6% $SiO_2$, 2.4% $Al_2O_3$. | 1.11 | 1.23 | 1.35 | (¹) | |
| 5 | Jointly coagulated oxide mixture: 96.4% $SiO_2$, 3.6% $Al_2O_3$. | 1.20 | 1.44 | (¹) | | |

¹ Too viscous to measure.

The table shows that the thickening action of the jointly coagulated mixtures prepared in accordance with this invention (Examples 4 and 5) is considerably greater than that of pure oxides (Example 1) or coformed mixed oxides (Example 2). Accordingly, it is obvious that by using the novel thickening agents of the present invention, less solid substance is required to obtain the same thickening action, or alternatively, a considerably greater thickening effect than heretofore can be obtained by adding the same quantity of solid.

Having thus described our invention together with preferred embodiments of same, what we claim and desire to secure by U.S. Letters Patent is:

1. A process for producing superior thickening agents for liquids and pastes which comprises mixing together, before the primary particles thereof have coagulated appreciably into larger secondary particles at least two separately produced pyrogenic aerosols each containing a finely-divided oxide of a different chemical element chosen from the group consisting of silicon, aluminum, titanium, iron, zirconium and vanadium and then coagulating the resulting mixture.

2. The process of claim 1, wherein the finely divided oxides comprise silicon oxide and aluminum oxide.

3. The process of claim 1, wherein each separately produced pyrogenic aerosol is produced by high temperature oxidation of vapors of a chemical compound containing the chosen element.

4. The process of claim 1, wherein each separately produced pyrogenic aerosol is produced by high temperature hydrolysis of vapors of a chemical compound of the chosen element.

5. The process of claim 1 wherein the finely divided oxides are silicon oxide and titanium oxide.

6. The process of claim 1 wherein the finely divided oxides are titanium oxide and aluminum oxide.

7. The process of claim 1 wherein one of said oxides comprises less than about 4% by weight of the coagulated product.

8. A superior pyrogenic inorganic oxide type thickening agent for liquids and pastes which consists of a novel, physical mixture of at least two finely divided pyrogenic oxides each of said oxides being an oxide of a different single chemical element chosen from the group consisting of silicon, aluminum, titanium, iron, zirconium and vanadium, said novel mixture being characterized by primary particles each of which is made up entirely of a single oxide of a single element and by secondary agglomerates which contain oxides of all of the elements in the mixture due to the fact that the separately formed individual oxides are mixed together in aerosol form immediately after formation thereof and before appreciable coagulation of the primary particles thereof into secondary agglomerates has occurred.

9. The thickening agent of claim 8 wherein the individual finely divided pyrogenic oxides are silica and alumina.

10. The thickening agent of claim 8 wherein the individual finely divided pyrogenic oxides are titania and alumina.

11. The thickening agent of claim 8 wherein the individual finely divided pyrogenic oxides are silica and titania.

References Cited in the file of this patent

UNITED STATES PATENTS

| 2,347,496 | Muskat et al. | Apr. 25, 1944 |
| 2,483,782 | Pierce | Oct. 4, 1949 |
| 2,902,351 | Stokes | Sept. 1, 1959 |
| 2,965,568 | Marsden | Dec. 20, 1960 |

FOREIGN PATENTS

| 713,211 | Great Britain | Aug. 4, 1954 |
| 726,250 | Great Britain | Mar. 16, 1955 |